United States Patent
Dean (10) Patent No.: US 11,824,700 B2
(45) Date of Patent: Nov. 21, 2023

(54) SYSTEMS AND METHODS FOR PEAK-TO-AVERAGE POWER RATIO (PAPR) REDUCTION IN OFDM SIGNALS

(71) Applicant: Morgan State University, Baltimore, MD (US)

(72) Inventor: Richard Dean, Marriottsville, MD (US)

(73) Assignee: Morgan State University, Baltimore, MD (US)

(*) Notice: Subject to any disclaimer, the term of this patent is extended or adjusted under 35 U.S.C. 154(b) by 0 days.

(21) Appl. No.: 17/519,942

(22) Filed: Nov. 5, 2021

(65) Prior Publication Data

US 2022/0141067 A1 May 5, 2022

Related U.S. Application Data

(60) Provisional application No. 63/109,979, filed on Nov. 5, 2020.

(51) Int. Cl.
*H04L 27/26* (2006.01)

(52) U.S. Cl.
CPC .... *H04L 27/2614* (2013.01); *H04L 27/26134* (2021.01)

(58) Field of Classification Search
CPC .............. H04L 27/2614; H04L 27/2618; H04L 27/262; H04L 27/2626; H04L 27/261; H04L 27/26134
See application file for complete search history.

(56) References Cited

U.S. PATENT DOCUMENTS

| | | | |
|---|---|---|---|
| 8,351,520 B2 * | 1/2013 | Woodward | H04L 27/2614 375/296 |
| 9,444,669 B2 | 9/2016 | Brecher et al. | |
| 10,784,934 B2 * | 9/2020 | Park | H04L 27/2614 |
| 10,797,925 B2 | 10/2020 | Park et al. | |
| 10,805,134 B2 | 10/2020 | Park et al. | |
| 2007/0116142 A1 * | 5/2007 | Molander | H04L 27/2624 375/260 |

OTHER PUBLICATIONS

Bonaccorso, Mario, et al. "Reducing the Peak to Average Power Ratio in OFDM Systems." Gretsi, 1999, pp. 781-784.

(Continued)

*Primary Examiner* — Betsy Deppe
(74) *Attorney, Agent, or Firm* — Whiteford, Taylor & Preston, LLP; Gregory M. Stone (57) ABSTRACT

Systems and methods are provided for reducing peak-to-average power ratio ("PAPR") in an orthogonal frequency division multiplexing ("OFDM") signal having reference tones by introducing modified pilot tones to cancel peaks in OFDM symbols in the OFDM signal array. The modified pilot tones are added to the original OFDM signal, which in turn conditions the OFDM symbols of the signal to effectively reduce the PAPR. Such systems and methods provide PAPR reduction for OFDM signals generated by an OFDM Signal Processor through the addition of tone reservation PAPR reduction methods, which use reserved tones such as pilot tones to improve PAPR. Such methods offer an advantage of improving the PAPR without introducing distortion to the signal.

8 Claims, 6 Drawing Sheets

(56) References Cited

OTHER PUBLICATIONS

Kumar, Rajendra and Vuttipol Santitewagul. "Transform Methods for the Reduction of the Peak to Average Power Ratio for the OFDM Signal." Hindawi Wireless Communications and Mobile Computing. vol. 2017, Article ID 1421362, 17 pages.

Rojo, G. and M. Stojanovic. "Peak-to-average power ratio (PAR) reduction for acoustic OFDM systems." Oceans 2009, MTS/IEEE Biloxi—Marine Technology for Our Future: Global and Local Challenges. 2009. 1-7.

* cited by examiner

SYSTEMS AND METHODS FOR PEAK-TO-AVERAGE POWER RATIO (PAPR) REDUCTION IN OFDM SIGNALS

CROSS REFERENCE TO RELATED APPLICATIONS

This application is based upon and claims the benefit of U.S. Provisional Application No. 63/109,979 titled "Peak-to-Average Power Ratio (PAPR) Reduction for OFDM," filed with the United States Patent & Trademark Office on Nov. 5, 2020, the specification of which is incorporated herein by reference in its entirety.

FIELD OF THE INVENTION

This invention is directed to systems and methods of signal processing, and more particularly to systems and methods for reducing the peak-to-average power ratio ("PAPR") of orthogonal frequency division multiplexing ("OFDM") signals.

BACKGROUND OF THE INVENTION

Improving the bandwidth efficiency of aeronautical channels has been one of the goals of the integrated Network Enhanced Telemetry (iNET) project. Given a fixed amount of spectrum, challenges exist in increasing spectrum efficiency. One option for improving spectral efficiency is OFDM, which is widely used in many digital communication systems such as cellular networks and wireless LAN systems. OFDM is a digital multi-carrier modulation scheme that extends the concept of single subcarrier modulation by using multiple subcarriers, or tones, within the same single channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme, such as QPSK, 4 QAM, 16 QAM, etc.) at low symbol rate. However, the combination of many subcarriers enables data rates similar to convention single-carrier modulation schemes within equivalent bandwidths. OFDM is known to provide high data rates, strong resistance to multipath effects, and high spectral efficiency.

Unfortunately, the transmitted OFDM signal often suffers from a high PAPR which limits its applications. For example, OFDM has seen only limited use in telemetry systems. As a result, several studies have focused on PAPR reduction techniques. PAPR reduction approaches are categorized into four broad classes: signal distortion, coding schemes, symbol scrambling techniques, and Tone Reservation (TR). Signal distortion techniques apply methods such as signal clipping that digitally clip the OFDM signal before the transmitting amplifier with minimal distortion. Coding schemes select code words that minimize PAPR. Symbol scrambling techniques add side information by using some of the subcarriers for peak reduction. Selective Mapping (SLM) is one such implementation of symbol scrambling techniques. Other techniques such as Tone Reservation (TR) implement simple yet efficient PAPR reduction without adding side information. However, the drawback with this technique is waste of bandwidth as some of the subcarriers are dedicated for PAPR reduction.

SUMMARY OF THE INVENTION

Disclosed herein are systems and methods for reducing PAPR in an OFDM signal having reference tones by introducing modified pilot tones to cancel peaks in OFDM symbols in the OFDM signal array. The modified pilot tones are added to the original OFDM signal, which in turn conditions the OFDM symbols of the signal to effectively reduce the PAPR.

Since the development of the integrated Network Enhanced Telemetry (iNET), the development of systems that improve the bandwidth efficiency of conventional point-to-point aeronautical channels has been a primary goal. OFDM has been central to attempts to develop a Link Dependent Adaptive Radio (LDAR) scheme where the channel model adapts to changes in the channel condition in real time. Adaptation mechanisms, such as Signal-to-Noise Ratio (SNR), or delay spread, are measured in real time to select a data rate for the communicating entities that improves the bandwidth efficiency while maintaining the quality and reliability of the channel. Central to using OFDM for LDAR is the mitigation of the PAPR of this modulation scheme.

Figure 1:
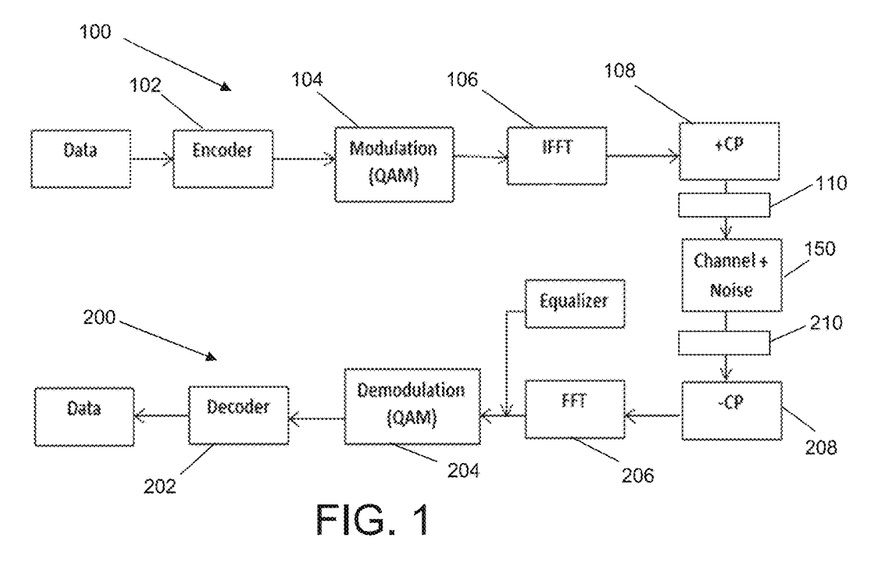
FIG. 1 is a schematic view of a system for transmitting and receiving OFDM signals.

An aeronautical channel may be modeled to replace the traditional point-to-point communication as shown in the OFDM Block Diagram of FIG. 1. As shown in that Figure, at the transmitter side, the data bit stream passes into a transmitter-side OFDM Signal Transmitter 100, where the data bit stream passes through an encoder 102 that implements the encoding for error control. The encoded bits are QAM-encoded in the modulation block 104. The encoded bits are parsed via a serial-to-parallel converter 106 where an Inverse Fast Fourier Transform (IFFT) process converts the signal from the frequency domain to the time domain. To reduce Inter Symbol Interference (ISI) during transmission, Cyclic Prefix is applied at block 108 before the data is transmitted by transmitter output 110 into the radio channel 150. Once that transmitted data is received at receiver input 210, the reverse operations are then applied at the OFDM Signal Receiver 200 to process the transmitted data. At the OFDM Signal Receiver 200, the cyclic prefix is removed at block 208 and a Fast Fourier Transform (IFFT) is applied at 206 to convert the signal from the time domain to the frequency domain. The FFT output is parsed via a parallel to serial converter, and QAM demodulation is applied at block 204. A QAM demodulated signal is decoded at 202, which results in the received bit stream which estimates the source data.

In accordance with certain aspects of an embodiment of the invention, the systems and methods described herein provide PAPR reduction for such OFDM signals generated by an OFDM Signal Processor 100 through the addition of tone reservation PAPR reduction methods, which use reserved tones such as pilot tones to improve PAPR. Such methods offer an advantage of improving the PAPR without introducing distortion to the signal. The methods described herein function by using the pilot tones to cancel the peak signals in the OFDM symbol.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIG. 7 is a schematic view of a data processing system for implementing a PAPR Reduction Module in accordance with certain aspects of an embodiment of the invention.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

In a test configuration implementing methods according to aspects of the invention, a 64 sample 4QAM OFDM tone structure was employed, in which 8 tones are typically reserved for channel equalization. Those skilled in the art will recognize that the systems and methods disclosed herein may likewise be applied to OFDM signals of differing structure. As discussed in detail below, complimentary tones are generated either by a search or by analysis using the methods set forth herein to find a tone choice that cancels peaks in the OFDM symbol. Because OFDM tones are orthogonal, they do not interfere with the data carrying symbols.

Figure 2A:
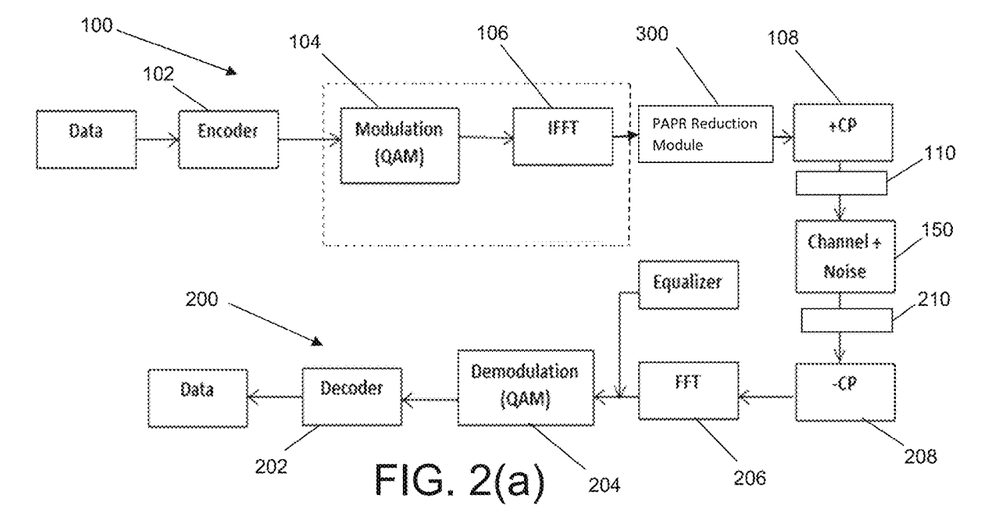
FIG. 2(a) is a schematic view of a system for transmitting and receiving OFDM signals and employing PAPR reduction in accordance with certain aspects of an embodiment of the invention.
Figure 2B:
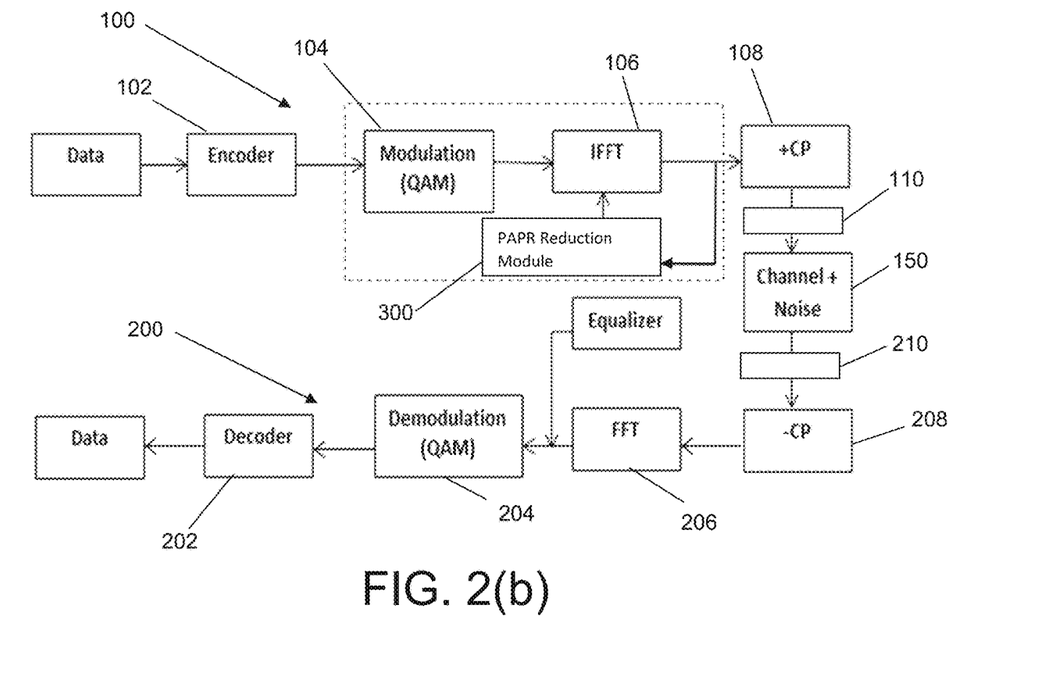
FIG. 2(b) is a schematic view of a system for transmitting and receiving OFDM signals and employing PAPR reduction in accordance with further aspects of an embodiment of the invention.

In accordance with certain aspects of an embodiment, a method for reducing PAPR in an OFDM signal may utilize the system shown in each of FIGS. 2(a) and 2(b), in which in each case the digital signal is again processed by OFDM Signal Transmitter 100 to generate the OFDM signal that is to be transmitted to OFDM Signal Receiver 200. However, in the systems shown in FIGS. 2(a) and 2(b), such OFDM signal includes a PAPR Reduction Module 300 which modifies the OFDM signal prior to its transmission. With regard to aspects of the invention, PAPR Reduction Module 300 may in each case include signal processing software that intercepts the OFDM signal prior to its transmission, removes the pilot tones from the OFDM signal, generates new pilot tones in OFDM symbols, combines those newly generated pilot tones with the OFDM symbols to form a reduced-PAPR OFDM signal, and transmits that reduced-PAPR OFDM signal from transmitter 110.

Figure 3:
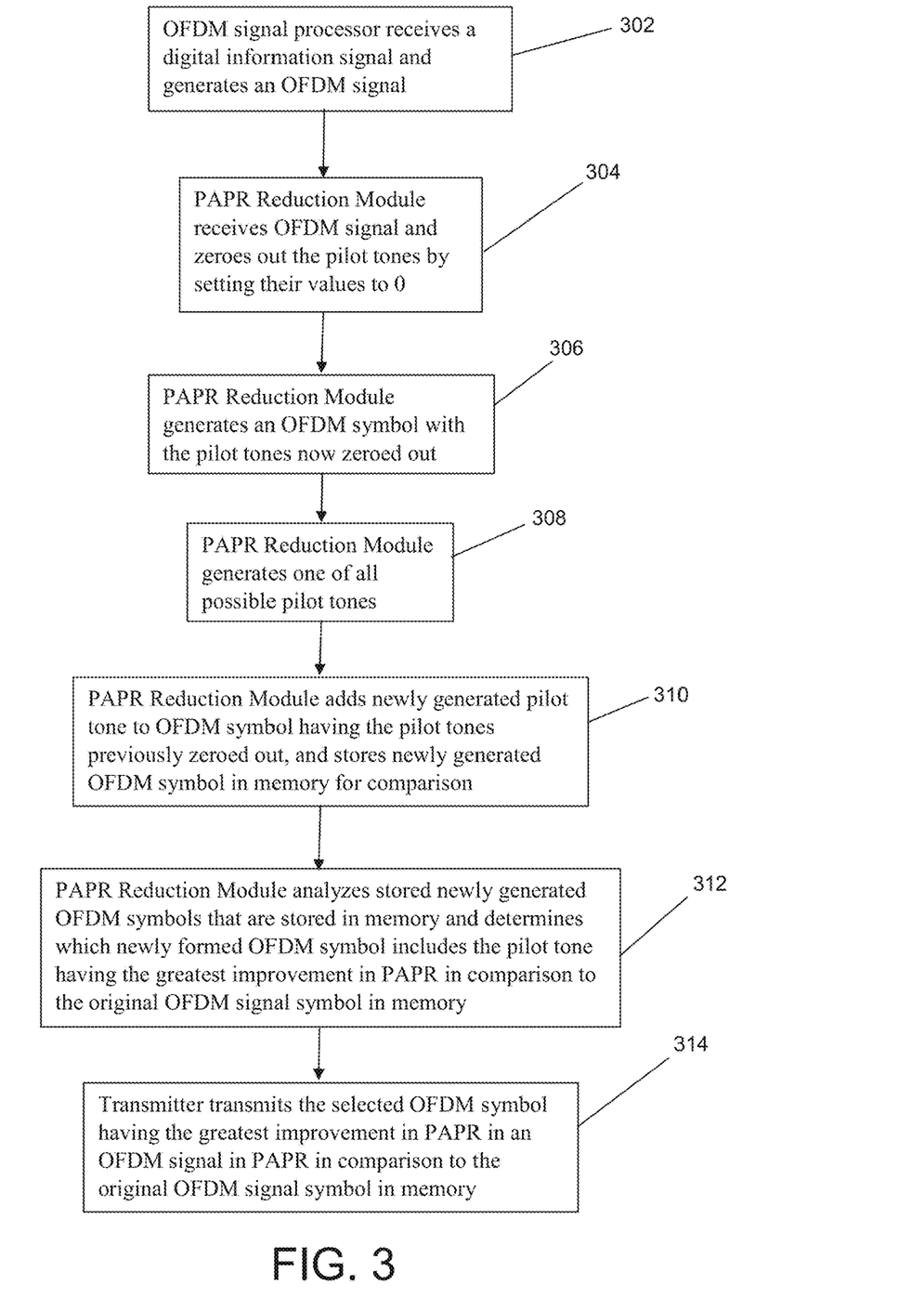
FIG. 3 is a flowchart depicting a method for transmitting OFDM signals and employing PAPR reduction in accordance with certain aspects of an embodiment of the invention.

More particularly and with respect to the first configuration shown in FIG. 2(a), an exemplary method as shown in FIG. 3 may be employed in which at step 302, OFDM Signal Transmitter 100 receives a digital information signal and generates an OFDM signal using known methods as discussed above with regard to FIG. 1. This is a part of the general method for OFDM modulation. For instance, in this exemplary 4QAM 64 tone OFDM structure, digital data is taken 2 bits at a time and assigned to each of the 64 tones with the exception of the pilot tones or the upper and low boundary tones. Next, at step 304, PAPR Reduction Module 300 receives the OFDM signal and zeroes out the pilot tones in that signal by setting their values to 0. In this exemplary structure, tones 4, 12, 20, 28, 36, 44, 52, and 60 are chosen, although those skilled in the art will recognize that other choices may be selected without departing from the spirit and scope of the invention. These 8 tones are then modified to have their values set to 0. At step 306, PAPR Reduction Module 300 then generates an OFDM symbol with the pilot tones now zeroed out. PAPR Reduction Module 300 then iteratively performs the following steps:

(i) At step 308, PAPR Reduction Module 300 generates one of all possible pilot tones. In a 4QAM OFDM tone structure, there are $4^8$ possible combinations of pilot tones (i.e., 8 possible pilot tones for each of the 4 symbols in the OFDM signal), such that the PAPR Reduction Module 300 will perform such step for all or at least a substantial number of the possible combinations; and (ii) At step 310, PAPR Reduction Module 300 adds the newly generated pilot tone to the OFDM symbol having the pilot tones previously zeroed out, and stores such newly generated OFDM symbol in memory for comparison.

After PAPR Reduction Module 300 has proceeded through an iteration of the foregoing steps (i) and (ii) for all or a substantial number of the possible combinations, at step 312, PAPR Reduction Module 300 analyzes the stored newly generated OFDM symbols that are stored in memory and determines which newly formed OFDM symbol includes the pilot tone having the greatest improvement in PAPR in comparison to the original OFDM signal. Finally, at step 314, transmitter 110 transmits the selected OFDM symbol having the greatest improvement in PAPR in an OFDM signal.

In a test configuration implementing the foregoing method, it was found that a random search of $2^{10}$ choices from the full $4^8$ (or $2^{16}$) possible combinations of pilot tones was sufficient to identify a suitable OFDM symbol with suitably reduced PAPR in comparison to the original signal.

Figure 4:
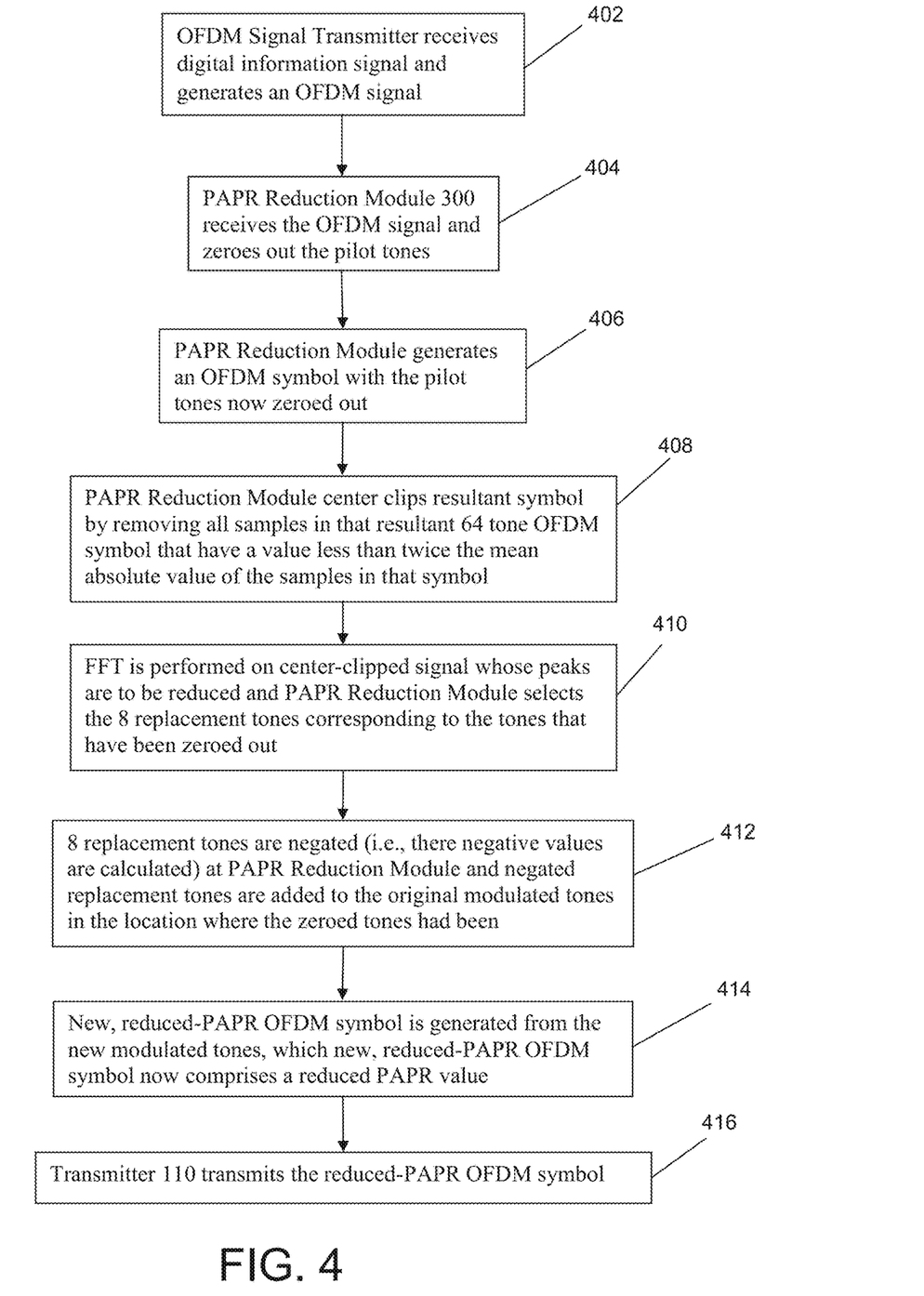
FIG. 4 is a flowchart depicting a method for transmitting OFDM signals and employing PAPR reduction in accordance with further aspects of an embodiment of the invention.
Figure 5A:
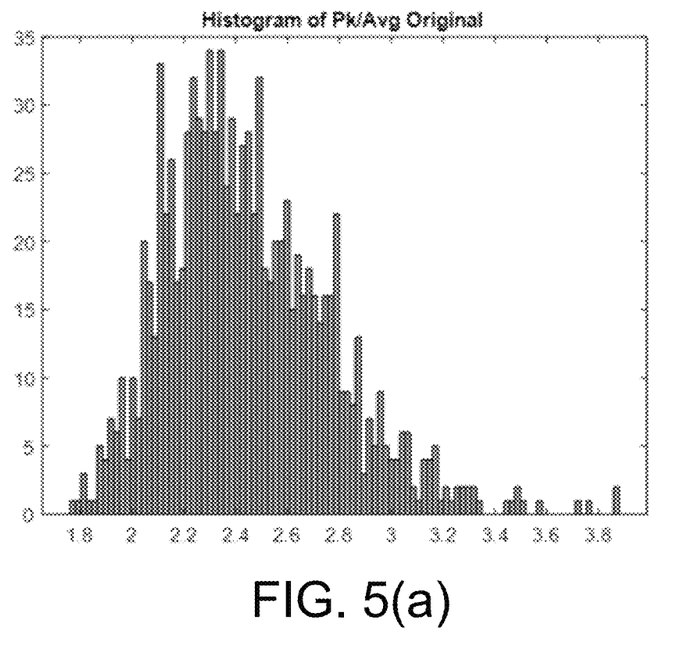
FIG. 5(a) is a histogram showing PAPR in an OFDM signal.
Figure 5B:
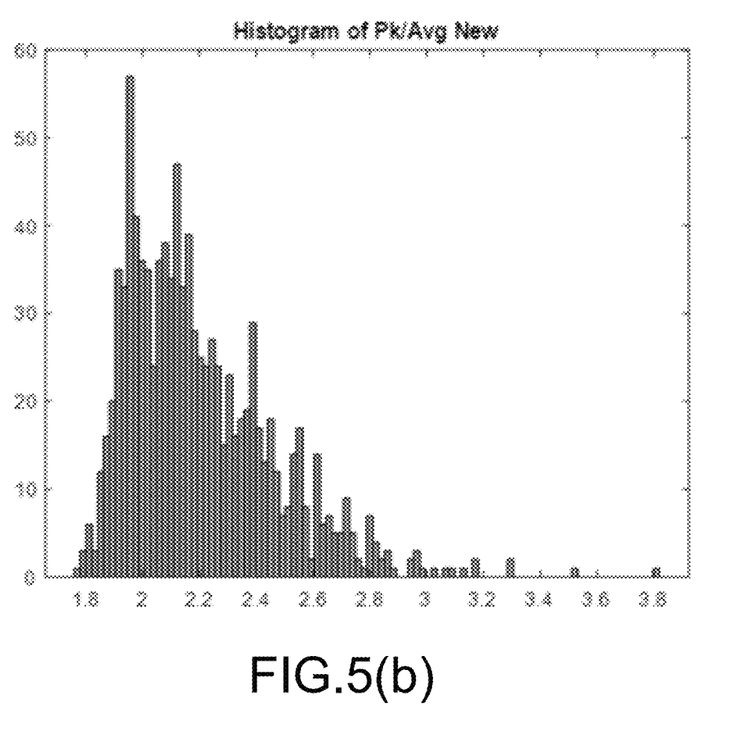
FIG. 5(b) is a histogram showing PAPR after application of PAPR reduction methods to the OFDM signal of FIG. 5(a) according to certain aspects of an embodiment of the invention.

Further and with respect to the system configuration shown in FIG. 2(*b*), an exemplary method as shown in FIG. 4 may be employed in which at step 402, OFDM Signal Transmitter 100 receives a digital information signal and generates an OFDM signal using known methods as discussed above with regard to FIG. 1. Next, at step 404, PAPR Reduction Module 300 receives the OFDM signal and zeroes out the pilot tones in that signal by setting their values to 0. In this exemplary structure, again tones 4, 12, 20, 28, 36, 44, 52, and 60 are chosen, although those skilled in the art will recognize that other choices may be selected without departing from the spirit and scope of the invention. These 8 tones are then modified to have their values set to 0. At step 406, PAPR Reduction Module 300 then generates an OFDM symbol with the pilot tones now zeroed out. More particularly, the remaining tones processed at step 406 comprise the original modulated tones, which are then used to generate a 64 sample OFDM symbol using an Inverse Fast Fourier Transform, thus producing a time domain signal. At step 408, PAPR Reduction Module 300 then center clips the resultant symbol by removing all samples in that resultant 64 tone OFDM symbol that have a value less than twice the mean of the absolute value of the samples in that symbol, thus forming a center clipped signal. Such center clipping keeps only the samples that are greater than twice the mean value of the symbol, with the original symbol remaining untouched. By way of non-limiting example and for further explanatory discussion purposes only, in the case of a 9-signal sequence comprising [1 −1 3 2 −3 −1 10 −2 −7], there exist clearly 2 peaks (i.e., 10, −7). Thus, the mean absolute value of the symbol is approximately 3.3. Now, all samples that are less than twice that mean (i.e., are less than 6.6) are zeroed out. Thus, the residual sequence is now [0 0 0 0 0 0 10 0 −7]. Now this symbol represents only the largest peaks of the OFDM symbol. Next, at step 410, FFT is performed on the center-clipped signal whose peaks are to be reduced. The signal is thus here transformed to the frequency domain, and PAPR Reduction Module 300 selects from this measure of the peak signals the 8 replacement tones corresponding to the tones that have been zeroed out. Next, at step 412, the 8 replacement tones are negated (i.e., there negative values are calculated) at PAPR Reduction Module 300, and those negated replacement tones are added to the original modulated tones in the location where the zeroed tones had been. This step 412 thus creates new modulated tones. Finally, at step 414, a new, reduced-PAPR OFDM symbol is generated from the new modulated tones (again, comprising the new replacement tones and the original modulated tones), which new, reduced-PAPR OFDM symbol in step 416 now comprises a reduced PAPR value.

Figure 6:
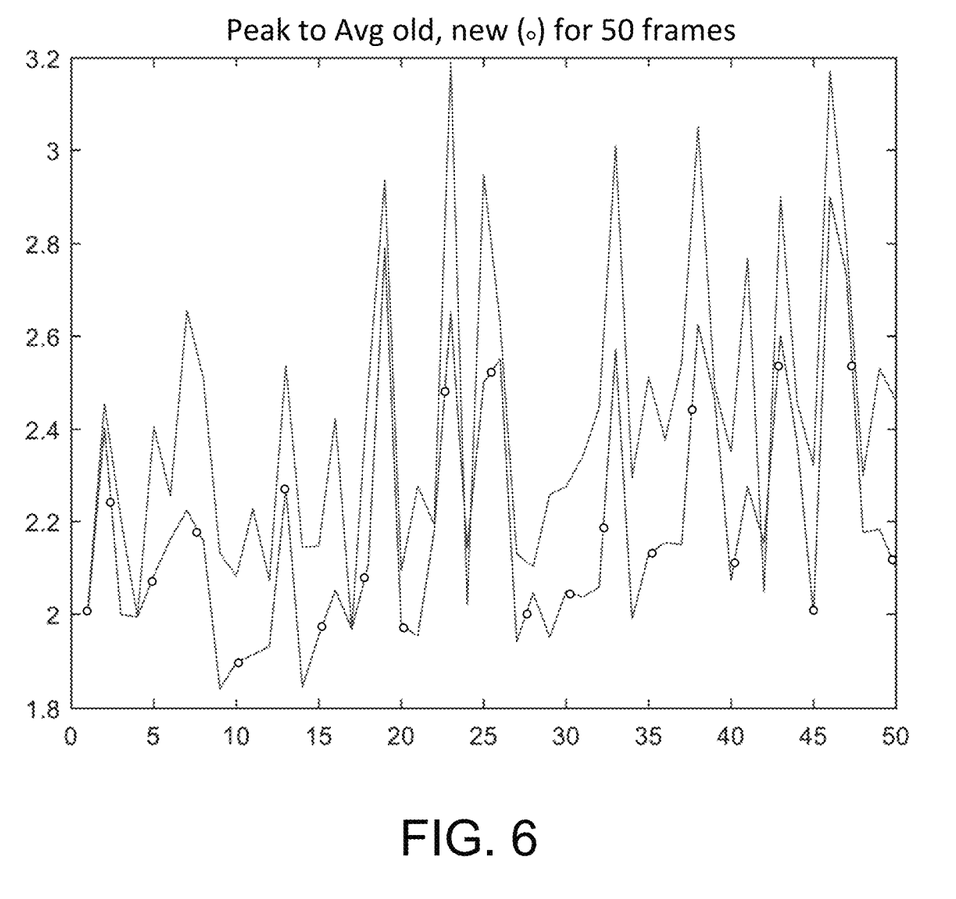
FIG. 6 is a graph showing original PAPR and reduced PAPR of a 50-frame sample of an OFDM signal after application of PAPR reduction methods according to certain aspects of an embodiment of the invention.

An exemplary code listing configured to carry out the methods described above and shown in FIG. 4 is provided in the attached appendix. Likewise, a trial of 10,000 OFDM symbols was run using the method described above and shown in FIG. 4, which produced the results shown in the histograms of FIGS. 5(*a*) (showing the PAPR of the original signal) and 5(*b*) (showing the PAPR of the signal post-processing as detailed above). In this case, the number of PAPR symbols greater than 3 in the original signal was 602, and in the, processed signal was 113. Further, this histogram for the processed signal shows sharp migration of the samples to the left, indicating an overall decrease of PAPR resulting from methods configured in accordance with aspects of the invention. Still further, FIG. 6 shows a graph of the original PAPR and the reduced PAPR of a 50-frame sample of an OFDM signal processed as discussed above, with each frame showing reduced PAPR and the largest peaks showing the greatest improvement in PAPR.

Those skilled in the art will recognize that PAPR Reduction Module 300 as described above may take the form of computer system 700 as reflected in FIG. 7, though variations thereof may readily be implemented by persons skilled in the art as may be desirable for any particular installation. In each such case, one or more computer systems 700 may carry out the foregoing methods as computer code.

Computer system 700 preferably includes a communications bus 702, or other communications infrastructure, which communicates data to other elements of computer system 700. For example, communications bus 702 may communicate data (e.g., text, graphics, video, other data) between bus 702 and an I/O interface 704, which may include a display, a data entry device such as a keyboard, touch screen, mouse, or the like, and any other peripheral devices capable of entering and/or viewing data as may be apparent to those skilled in the art. Further, computer system 700 includes a processor 706, which may comprise a special purpose or a general purpose digital signal processor. Still further, computer system 700 includes a primary memory 708, which may include by way of non-limiting example random access memory ("RAM"), read-only memory ("ROM"), one or more mass storage devices, or any combination of tangible, non-transitory memory. Still further, computer system 700 includes a secondary memory 710, which may comprise a hard disk, a removable data storage unit, or any combination of tangible, non-transitory memory. Finally, computer system 700 may include a communications interface 712, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 708, secondary memory 710, communications interface 712, and combinations of the foregoing may function as a computer usable storage medium or computer readable storage medium to store and/or access computer software including computer instructions. For example, computer programs or other instructions may be loaded into the computer system 700 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory 710, or through data communication bus 702 to primary memory 708.

Communication interface 712 allows software, instructions and data to be transferred between the computer system 700 and external devices or external networks. Software, instructions, and/or data transferred by the communication interface 712 are typically in the form of signals that may be electronic, electromagnetic, optical or other signals capable of being sent and received by communication interface 712. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow processor 706 of computer system 700 to implement the methods discussed herein for predictive risk assessment and intervention according to computer software including instructions.

Computer system 700 may perform any one of, or any combination of, the steps of any of the methods described herein. It is also contemplated that the methods according to the present invention may be performed automatically, or may be accomplished by some form of manual intervention.

The computer system 700 of FIG. 3 is provided only for purposes of illustration, such that the invention is not limited to this specific embodiment. Persons having ordinary skill in the art are capable of programming and implementing the instant invention using any computer system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

APPENDIX

```
% This code experiments with the improvement of the Peak of the
% OFDM signal by the addition of a modified pilot that compliments the
% peaks. The method below to compute the pilot tones based in the peak values
close all
clear all
No_fft_tones=64;
M=4;   %modulation
Num_Pilot=8;   %Num pilot tones
Coding_trellis = poly2trellis([7],[171 133]);   %Generator plynomial for coding
%Several options for random sequences
%pilot = pilot_gen16( );   %16qam , 2^16values
pilot = pilot_gen(Num_Pilot); %4qa , 2^16 values
%pilot = Walsh_Haddamard_Pilot64( );   %32 qam values
Lp=[4:8:64];   %Location of pilots
mx=10000   %nnumber of trial symbols
for k=1:mx   % Number of trials
%first generate normal ofdm signal
data=randi([0,1],1,128); % Generate random data
[Encoded_data] = Encoder (data,Coding_trellis,2,0,1); %Convolutional Coding
Enc=Encoded_data;
[Modulated_Signal] = QAM_mod(Encoded_data,No_fft_tones,M);
Modulated_Signal(1,Lp)=0.0*Modulated_Signal(1,Lp); %Now zero out pilot tones
ofdm_symbols = OFDM_mod (Modulated_Signal,No_fft_tones);% Generate ofdm symbols
% plot(abs(ofdm_symbols))
% hold
Orig_peak(k)=max(abs(ofdm_symbols));   %save original peak, avg, pk2avg
Orig_mean(k)=mean(abs(ofdm_symbols));
Orig_peak_to_avg(k)=Orig_peak(k)/Orig_mean(k);
%now develop the pilot tone to cancel the peaks
OFDM_New=ofdm_symbols; %build center clipped signal
Mean=mean(abs(ofdm_symbols))
for n=1:length(ofdm_symbols)
   if abs(ofdm_symbols(n))<2*Mean
      OFDM_New(n)=0;   %Center clip signal
   end
end
%Now compute spectrum of clipped signal
OFDM_New_Freq=fft(OFDM_New,64);
%Now add these back in
OFDM_New_tones=OFDM_New_Freq(1,Lp);
%plot(abs(OFDM_New_tones))
New_Mod=zeros(1,64);
New_Mod(1,Lp)=-1.0*OFDM_New_tones; %add in neg of clipped signal
New_Mod=New_Mod+Modulated_Signal; %now add back in tones
new_ofdm_symbols = OFDM_mod (New_Mod,No_fft_tones);% Generate ofdm symbols
pkav(k)=max(abs(ofdm_symbols))./mean(abs(ofdm_symbols));
pkav_new(k)=max(abs(new_ofdm_symbols))./mean(abs(new_ofdm_symbols));
end
% This code counts the number of Pk/Av > than 3 for old and new
Old=0
New=0
for j=1:mx
   if pkav(j)>3.0
      Old=Old+1;
   end
```

-continued

APPENDIX

```
    if pkav_new(j) >3.0
      New=New+1;
    end
  end
end
%Plot histograms
figure(3)
histogram(pkav, 100)
title("Histogram of Pk/Avg Original")
figure(4)
histogram(pkav_new, 100)
title("Histogram of Pk/Avg New")
```

What is claimed is:

1. A method of reducing peak-to-average power ratio ("PAPR") in OFDM signals, comprising the steps of:
receiving a digital information signal at a PAPR reduction module, said PAPR reduction module having a processor and a memory;
generating an original OFDM signal from said digital information signal having multiple OFDM symbols;
setting pilot tones in said original OFDM signal to zero;
generating a new OFDM symbol with the pilot tones zeroed out;
generating new pilot tones and adding each said new pilot tone to said new OFDM symbol to produce multiple new OFDM symbols having new pilot tones;
identifying one of said multiple new OFDM symbols having new pilot tones as having a greatest improvement in PAPR in comparison to said original signal; and
transmitting said identified one of said new OFDM symbols having new pilot tones in an OFDM signal from a transmitter in communication with said PAPR module.

2. The method of claim 1, wherein said steps of generating new pilot tones and adding each said new pilot tone to OFDM symbol further comprises the steps of iteratively:
(i) generating new pilot tones from each one of multiple possible combinations of pilot tones of the original OFDM signal;
(ii) adding each said new pilot tone to said new OFDM symbol to generate an associated reduced-PAPR OFDM symbol;
(iii) storing said associated reduced-PAPR OFDM symbol in memory; and
(iv) repeating steps (i)-(iii) for each of said multiple possible combinations of pilot tones of the original OFDM signal with pilot tones set to zero.

3. The computer method of claim 2, further comprising the steps of:
comparing a plurality of iteratively generated reduced-PAPR OFDM symbols;
wherein said step of identifying said one of said new OFDM symbols having new pilot tones as having a greatest improvement in PAPR is carried out based on said comparing step.

4. A method for reducing peak-to-average power ratio ("PAPR") in OFDM signals, comprising the steps of:
receiving a digital information signal at a PAPR reduction module, said PAPR reduction module having a processor and a memory;
generating an original OFDM signal from said digital information signal having multiple OFDM symbols;
setting pilot tones in said original OFDM signal to zero;
generating a new OFDM symbol with the pilot tones zeroed out;
removing all samples in said new OFDM symbol having a value less than a multiple of a mean of an absolute value of said samples to form a center clipped signal;
performing FFT on the center clipped signal to generate a frequency domain signal;
selecting, from said frequency domain signal, replacement tones corresponding to said pilot tones that have been zeroed out;
generating revised pilot tones equal to the negative value of the selected replacement tones and adding said revised pilot tones to said frequency domain signal at a location at which said pilot tones had been zeroed out; and
generating a reduced-PAPR OFDM symbol comprising a combination of said revised pilot tones and said pilot tones in said original OFDM signal.

5. A system for reducing peak-to-average power ratio ("PAPR") in OFDM signals, comprising:
an OFDM signal generator;
an OFDM signal transmitter in communication with said OFDM signal generator; and
a PAPR reduction module in communication with said OFDM generator and said OFDM signal transmitter, said PAPR reduction module having a processor and memory storing computer instructions thereon configured for execution by the processor to:
receive an original OFDM signal from said OFDM signal generator, said original OFDM signal having multiple OFDM symbols;
set pilot tones in said original OFDM signal to zero;
generate a new OFDM symbol with the pilot tones zeroed out;
generate new pilot tones and add each said new pilot tone to said new OFDM symbol to produce multiple new OFDM symbols having new pilot tones;
identify one of said multiple new OFDM symbols having new pilot tones as having a greatest improvement in PAPR in comparison to said original OFDM signal; and
transmit said identified one of said new OFDM symbols having new pilot tones in an OFDM signal from said OFDM signal transmitter.

6. The system of claim 5, wherein said computer instructions configured for execution by the processor to generate new pilot tones and add each said new pilot tone to said new OFDM symbol are further configured to iteratively:
(i) generate new pilot tones from each one of multiple possible combinations of pilot tones of the original OFDM signal;

(ii) add each said new pilot tone to said new OFDM symbol to generate an associated reduced-PAPR OFDM symbol;
(iii) store said associated reduced-PAPR OFDM symbol in said memory; and
(iv) repeat instructions (i)-(iii) for each of said multiple possible combinations of pilot tones of the original OFDM signal with pilot tones set to zero.

7. The system of claim 6, said computer instructions being further configured for execution by the processor to:
compare a plurality of iteratively generated reduced-PAPR OFDM symbols;
wherein said computer instructions configured to identify said one of said new OFDM symbols having new pilot tones as having a greatest improvement in PAPR is carried out based on said comparing step.

8. A system for reducing peak-to-average power ratio ("PAPR") in OFDM signals, comprising:
an OFDM signal generator;
an OFDM signal transmitter in communication with said OFDM signal generator; and
a PAPR reduction module in communication with said OFDM generator and said OFDM signal transmitter, said PAPR reduction module having a processor and memory storing computer instructions thereon configured for execution by the processor to:
receive a digital information signal at the PAPR reduction module;
generate an original OFDM signal from said digital information signal having multiple OFDM symbols;
set pilot tones in said original OFDM signal to zero;
generate a new OFDM symbol with the pilot tones zeroed out;
remove all samples in said new OFDM symbol having a value less than a multiple of a mean of an absolute value of said samples to form a center clipped signal;
perform FFT on the center clipped signal to generate a frequency domain signal;
select, from said frequency domain signal, replacement tones corresponding to said pilot tones that have been zeroed out;
generate revised pilot tones equal to the negative value of the selected replacement tones and add said revised pilot tones to said frequency domain signal at a location at which said pilot tones had been zeroed out; and
generate a reduced-PAPR OFDM symbol comprising a combination of said revised pilot tones and said pilot tones in said original OFDM signal.

* * * * *